(12) United States Patent
Dooley et al.

(10) Patent No.: US 7,193,560 B2
(45) Date of Patent: Mar. 20, 2007

(54) GPS RECEIVER

(75) Inventors: Saul R. Dooley, Horley (GB); Andrew T. Yule, East Grinstead (GB)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/532,928

(22) PCT Filed: Oct. 14, 2003

(86) PCT No.: PCT/IB03/04533

§ 371 (c)(1), (2), (4) Date: Apr. 27, 2005

(87) PCT Pub. No.: WO2004/040328

PCT Pub. Date: May 13, 2004

(65) Prior Publication Data

US 2005/0270233 A1 Dec. 8, 2005

(30) Foreign Application Priority Data

Oct. 30, 2002 (GB) ................................. 0225204.7

(51) Int. Cl.
G01S 5/14 (2006.01)

(52) U.S. Cl. .............................. 342/357.15; 342/357.06

(58) Field of Classification Search ........... 342/357.15, 342/357.06

See application file for complete search history.

(56) References Cited

U.S. PATENT DOCUMENTS

| 5,146,231 A * | 9/1992 | Ghaem et al. ......... 342/357.08 |
| 5,818,389 A | 10/1998 | Lazar |
| 2002/0044085 A1 | 4/2002 | Howell et al. |

OTHER PUBLICATIONS

NavTalk Cellular Phone/GPS Receiver: Owners Manual and Reference Guide, Garmin Corporation, Jan. 2000.*

* cited by examiner

*Primary Examiner*—Thomas H. Tarcza
*Assistant Examiner*—F H Mull

(57) ABSTRACT

A GPS receiver is disclosed which has an omnidirectional antenna and a directional antenna and is configured to (i) acquire a first GPS signal from the output of the directional antenna, either alone or combined with the output of the omnidirectional antenna, and (ii) acquire a second GPS signal from the output of the omnidirectional antenna alone. Also, disclosed is a GPS receiver having an omnidirectional antenna and a directional antenna which is configured to acquire a GPS signal from the output of the directional antenna alone.

3 Claims, 1 Drawing Sheet

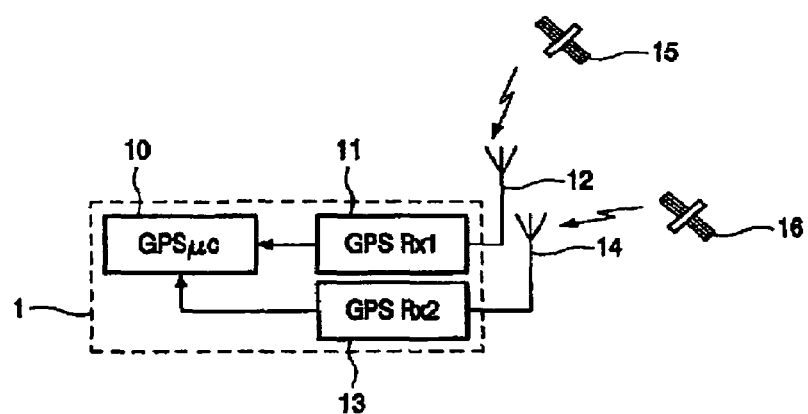

GPS RECEIVER

This invention relates to a GPS receiver having both an omnidirectional antenna and a directional antenna.

U.S. Pat. No. 5,818,389 discloses such a GPS receiver in which the directional antenna is primarily used for receiving signals from a possible source of interference, and in which both antennae in combination are used to determine the direction towards any such source. U.S. Pat. No. 5,818,389 further indicates at lines 37 to 45 of column 9 that the GPS receiver may "acquire and track [GPS] satellites with the added gain of the directional antenna when most of the interfering signal is not in the directional beam and a substantial portion of the [GPS] signal is within the directional beam".

It is an object of the invention to provide a GPS receiver having both an omnidirectional antenna and a directional antenna, and with improved ability to acquire weak GPS signals.

In accordance with the present invention, there is provided such a GPS receiver configured to (i) acquire a first GPS signal from the output of the directional antenna, either alone or combined with the output of the omnidirectional antenna, and (ii) acquire a second GPS signal from the output of the omnidirectional antenna alone.

The inventors have realised that whilst it can be desirable to use a relatively directional antenna to increase the chances of acquiring a weak GPS signal (as the maximum gain in the main lobe of a directional antenna is generally greater than that of a relatively omnidirectional antenna), an omnidirectional antenna will still be required to acquire satellites located in the directional antenna's nulls. Furthermore, the combining of the outputs of an omnidirectional antenna and a directional antenna as disclosed in U.S. Pat. No. 5,818,389 reduces the signal to noise ratio for signals from those satellites located in the directional antenna's nulls whereby the only significant signal contribution for those satellites comes from the output of the omnidirectional antenna. By being able to acquire one signal from the directional antenna and another signal from the omnidirectional antenna alone, this disadvantage is avoided.

The second GPS signal and subsequent GPS signals may be acquired using assistance data obtained from the first GPS signal (such assistance data includes as almanac, ephemeris, frequency reference, Doppler and code phase information).

This is particularly useful in an environment where there is significant satellite obscuration. For example, a user of a handheld GPS receiver located indoors may direct the GPS receiver so that the main lobe of the directional antenna is directed to a window, thereby enabling the GPS receiver to acquire a first GPS signal from the output of the directional antenna by line of sight (or strong signal reflection) though the window. Then, with assistance data from the first GPS signal, the GPS receiver then has an increased chance of acquiring weaker signals, e.g. through walls, from the output of the omnidirectional antenna.

Conveniently, such a GPS is packaged for sale with instructions directing a user of the GPS receiver to point it in a direction (corresponding to a lobe of the directional antenna) from which a GPS signal is most likely to be acquired such as a window in an indoor environment or a gap between buildings in an urban canyon.

Also provided in accordance with the present invention is a GPS receiver having an omnidirectional antenna and a directional antenna characterised by the GPS receiver being configured to acquire a GPS signal from the output of the directional antenna alone.

The present invention will now be described, by way of example only, with reference to the accompanying schematic drawing in which:

The FIGURE shows a GPS receiver in accordance with the present invention.

It is well known to provide a GPS receiver in which replica GPS satellite pseudorandom noise (PRN) code signals are continuous generated and correlated with received GPS signals in order to acquire them. Typically, as the replica codes are likely to have a different code phase to those of the received GPS signals and also a different frequency due to Doppler shift between the receiver and orbiting satellites, a two dimensional code frequency/phase sweep is employed whereby such a sweep will eventually result in the incoming PRN code having the same frequency and code phase as that of the locally generated replica. If detected, the code is acquired and tracked, and the pseudorange information may be retrieved from which the position of the receiver may be calculated using conventional navigation algorithms.

Such a GPS receiver 1 is shown, schematically, in FIG. 1 having both an omnidirectional antenna 12 and a directional antenna 14 with corresponding receiver front ends 11, 13, all under the control of a GPS microprocessor 10 which is further responsible for processing the signals in parallel digital receiver channels (not shown) in a conventional manner.

The terms omnidirectional and directional are intended to be relative to each other in that the omnidirectional antenna has gain in most directions whereas the directional antenna has a more pronounced high gain, lobe in at least one direction but perhaps significant nulls in other directions. The design of such antennae to have a chosen frequency response range and lobe/gain pattern is entirely conventional.

In accordance with the present invention, the GPS receiver is able to acquire GPS signals as illustrated in the following example scenario:

EXAMPLE

In an urban canyon, a GPS receiver tries and fails to acquire any one of a number of GPS signals it is attempting to simultaneously acquire using an output from the omnidirectional antenna. The GPS receiver informs the user of failure by way of an audible alert.

Suppose that the documentation supplied at sale with the GPS receiver states that in the event of such an alert, the user should point the GPS receiver towards a gap in such an urban canyon to increase the likelihood of signal acquisition.

After providing such an audible alert, the GPS receiver switches from using an output from the omnidirectional antenna to an output from the directional antenna, and the user points point the GPS receiver (and hence the directional antenna) towards a gap in the urban canyon. With the increased gain of the directional antenna (either alone or in combination with the output of the omnidirectional antenna), it is more likely to acquire a GPS signal (albeit in a limited field of view) and for the purpose of this illustration, let us suppose it does.

Having acquired one GPS signal using the output from the directional antenna, the GPS receiver can then listen to the ephemeris data message which describes the orbits of the satellites. In addition, the GPS receiver also has a reference frequency with which to resolve local oscillator errors and if the GPS receiver is in possession of a rough estimate of its current position based on a last known position (which does not have to be particularly accurate), the GPS receiver can speculate about the observed frequency of other GPS signals and also the code phase of their respective pseudorandom noise codes with which they are modulated.

The GPS receiver then attempts to acquire the remaining signals using an output from the omnidirectional antenna alone using assistance data from the GPS signal acquired using the directional antenna, and it does so with a much increased likelihood of being able to acquire the remaining signals.

The invention claimed is:

1. A GPS receiver having an omnidirectional antenna and a directional antenna characterised by the GPS receiver being configured to:

(i) acquire a first GPS signal from the output of the directional antenna, either alone or combined with the output of the omnidirectional antenna, and (ii) acquire a second GPS signal from the output of the omnidirectional antenna alone using assistance data obtained from the first GPS signal.

2. A GPS receiver according to claim 1 packaged for sale with instructions directing a user of the GPS receiver to point the GPS receive in a direction from which a GPS signal is most likely to be acquired.

3. A GPS receiver according to claim 1, wherein the GPS receiver is configured to acquire the first GPS signal from the output of the directional antenna alone.

* * * * *